United States Patent
Rune et al.

(10) Patent No.: US 9,681,430 B2
(45) Date of Patent: Jun. 13, 2017

(54) METHODS AND ARRANGEMENTS FOR SEMI-PERSISTENT SCHEDULING

(71) Applicant: Telefonaktiebolaget L M Ericsson (publ), Stockholm (SE)

(72) Inventors: Johan Rune, Lidingö (SE); Erik Eriksson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 8 days.

(21) Appl. No.: 14/436,324

(22) PCT Filed: Oct. 29, 2012

(86) PCT No.: PCT/SE2012/051170
§ 371 (c)(1),
(2) Date: Apr. 16, 2015

(87) PCT Pub. No.: WO2014/070049
PCT Pub. Date: May 8, 2014

(65) Prior Publication Data
US 2015/0245326 A1    Aug. 27, 2015

(51) Int. Cl.
*H04W 72/04* (2009.01)
*H04L 1/00* (2006.01)
*H04L 1/16* (2006.01)
*H04L 5/00* (2006.01)
*H04W 72/12* (2009.01)

(52) U.S. Cl.
CPC ......... *H04W 72/042* (2013.01); *H04L 1/0003* (2013.01); *H04L 1/0009* (2013.01); *H04L 1/0016* (2013.01); *H04L 1/1671* (2013.01); *H04L 5/006* (2013.01); *H04W 72/1231* (2013.01)

(58) Field of Classification Search
CPC ... H04L 1/0003–1/0018; H04W 72/04; H04W 72/0406; H04W 72/042
See application file for complete search history.

(56) References Cited

U.S. PATENT DOCUMENTS

2009/0170509 A1    7/2009 Cai et al.
2009/0323641 A1   12/2009 Futagi et al.
(Continued)

FOREIGN PATENT DOCUMENTS

EP    1973255 A1    9/2008

OTHER PUBLICATIONS

Unknown, Author, "Link adaptation overhead reduction for VoIP", 3GPP TSG-RAN-WG2 Meeting #58bis, R2-072775, Research in Motion Ltd., Orlando, Florida, USA, Jun. 25-29, 2007, 1-4.

*Primary Examiner* — Pao Sinkantarakorn
(74) *Attorney, Agent, or Firm* — Murphy, Bilak & Homiller, PLLC

(57) ABSTRACT

Base station, UE and methods therein associated with transmission resources allocated by Semi-Persistent Scheduling, SPS. The method in a UE comprises receiving information about a set of Modulation and Coding Schemes, MCSs from a Base Station, BS. The MCSs are associated with resources allocated by SPS. Further, the method comprises determining an MCS from the set, for communication on at least one resource allocated by SPS, and then transmitting and/or receiving data on the at least one resource allocated by SPS, using the determined MCS.

26 Claims, 9 Drawing Sheets

(56) References Cited

U.S. PATENT DOCUMENTS

2010/0014500 A1\* 1/2010 Lee .................. H04L 1/0017
                                                370/342
2012/0093096 A1\* 4/2012 Barbieri ............ H04J 3/1694
                                                370/329

\* cited by examiner

METHODS AND ARRANGEMENTS FOR SEMI-PERSISTENT SCHEDULING

TECHNICAL FIELD

The invention relates generally to transmission of data in a communication system, and in particular to reducing transmission overhead and saving battery power in association with transmission resources allocated by Semi-Persistent Scheduling, SPS.

BACKGROUND

A central topic of the novel mechanisms presented herein is resource allocation, also referred to as scheduling in cellular communication networks, with EPS/LTE (Evolved Packet System/Long Term Evolution) as the main example. Scheduling in cellular communication networks involves allocating transmission resources for communication pertaining to a certain wireless terminal. These transmission resources may be uplink (i.e. in the direction from the wireless terminal to a network node, e.g. a base station) or downlink (i.e. in the direction from a network node, e.g. a base station (BS), to a wireless terminal) transmission resources.

In EPS/LTE transmission resources consist of parts of a time-frequency grid and a wireless terminal is commonly referred to as a user equipment (UE). The smallest transmission resource unit in EPS/LTE is called a resource element, which are grouped into resource blocks. A resource block consists of 12 subcarriers of 15 kHz each in the frequency domain and a slot of length 0.5 ms in the time domain. Pairs of slots are further grouped together to form 1 ms subframes. Each slot consists of 7 resource elements (or 6 if an extended cyclic prefix is used), each containing an OFDM symbol including cyclic prefix. Hence, each resource block consists of 84 resource elements (or 72 if the extended cyclic prefix is used)

The basis for uplink and downlink scheduling in cellular communication networks, like EPS/LTE is so-called dynamic scheduling. In dynamic scheduling, a new scheduling decision is taken in each schedulable timeslot, which allows for full flexibility in terms of the resources used. In EPS/LTE such a schedulable timeslot is a 1 millisecond long so called subframe. By use of dynamic scheduling, large variations in the amount of data to transmit can be handled, at the cost of scheduling decisions being sent on a downlink control channel, e.g. the PDCCH (Physical Downlink Control Channel) in each schedulable timeslot. In EPS/LTE (Evolved Packet System/Long Term Evolution), transmission resources, in terms of time and frequency, are typically allocated by a scheduler in an eNB for each downlink or uplink transmission. The allocated transmission resources are then indicated on the PDCCH by use of a scheduling assignment in case of downlink (also called downlink resource assignment), or, an uplink grant in case of uplink. Uplink resource allocations, i.e. uplink grants, are typically preceded by a scheduling request from the UE, while downlink resource allocations are triggered by pending downlink data. Associated with each resource allocation, and indicated on the PDCCH, is a modulation and coding scheme (MCS), which is selected by the eNB and which is used for the data transmission on the transmission resources that are allocated by the resource allocation. The transport block size is not explicitly indicated in the resource allocation, but may be derived from the combination of the size of the allocated resources, i.e. the number of resource blocks, and the MCS.

Scheduling in LTE is performed on a subframe basis, and in each subframe the available bandwidth may be allocated to one or more UEs. In the frequency domain the allocations have to adhere to resource block boundaries. The smallest possible allocation is thus two resource blocks, one in each slot of a subframe. When data is transmitted using the allocated resources, the MCS and transport format are chosen such that they match the size of the allocated resources and the bits to be transmitted are mapped to the resource elements (and OFDM symbols) of the allocated resource. In order to enable coherent detection at the receiver (i.e. the eNB), a transmitting UE includes a cell specific Demodulation Reference Signal (DMRS) interleaved with the data. Specifically, the DMRS is transmitted in the fourth (or third if an extended cyclic prefix is used) OFDM symbol of each slot, i.e. twice every subframe, across the entire allocated transmission resource, i.e. on all subcarriers of the allocated resource blocks. From 3GPP release 11 a DMRS may be made UE specific based on a combination of DMRS sequence and phase rotation of the sequence.

For downlink transmissions, the cell specific reference signals are typically all reference signals that are needed. However, optionally, the eNB may insert UE specific reference signals in the third or sixth OFDM symbol (when a normal cyclic prefix is used) every second subcarrier of a resource block transmitted to a UE.

In a currently popular vision of the future development of the communication in cellular networks, huge numbers of, mostly, small autonomous devices become increasingly important. These devices are assumed not to be associated with humans, but rather to be sensors or actuators of different kinds, which communicate with application servers, which configure the devices and receive data from them, within or outside the cellular network. Hence, this type of communication is often referred to as machine-to-machine (M2M) communication and the devices may be denoted machine devices (MDs). In the 3GPP standardization the corresponding alternative terms are machine type communication (MTC) and machine type communication devices (MTC devices), with the latter being a subset of the more general term user equipment, UE. In terms of numbers MTC devices will, according to the vision, dominate over human users, but since many of them will communicate very scarcely, their part of the traffic volume will be much smaller than their part of the "user" population.

With the nature of MTC devices and their assumed typical uses follow that they will often have to be very energy efficient, since external power supplies will often not be available and since it is neither practically nor economically feasible to frequently replace or recharge their batteries.

For such energy deprived devices the traffic is characterized by small, more or less infrequent transactions—often delay tolerant, which will result in a large signaling overhead. Hence, reducing the signaling overhead is an important means to facilitate for such devices to function efficiently, with a long battery lifetime, using a wireless communication network.

SUMMARY

The herein suggested technology enables improving both system resource efficiency and energy efficiency by applying a certain type of improved so-called semi-persistent scheduling (SPS), e.g. to transmissions as the ones described in the previous section. This may be achieved by methods and arrangements according to the appended claims. The characteristics of SPS will be described in the detail description further below.

According to a first aspect, a method is provided, which is to be performed by a UE, which is associated with transmission resources, allocated by SPS. The method comprises receiving information, from a BS, about a set of MCSs associated with resources allocated by SPS. The method further comprises determining an MCS from the set for communication on at least one resource allocated by SPS. The method further comprises transmitting (uplink) and/or receiving (downlink) data on the at least one resource allocated by SPS, using the determined MCS.

According to a second aspect, a UE is provided. The UE is operable to be allocated transmission resources by SPS. The UE comprises a functional unit, adapted to receive information from a BS about a set of MCSs associated with resources allocated by SPS. The UE further comprises one or more functional units adapted to determine (select or identify) an MCS from the set, for communication on at least one of the resources allocated by SPS. The UE further comprises a functional unit, adapted to transmit (uplink) and/or receive (downlink) data on the at least one resource allocated by SPS, using the determined MCS.

According to a third aspect, a method is provided to be performed by a BS serving a UE and being associated with transmission resources allocated to the UE by SPS. The method comprises transmitting information to the UE about a set of MCSs associated with resources allocated by SPS. The method further comprises determining an MCS from the set and receiving (uplink) data from, and/or transmitting (downlink) data to, the UE on at least one of the resources allocated by SPS, using the determined MCS.

According to a fourth aspect a base station, BS, is provided. The BS is operable to operable to serve a UE associated with transmission resources, allocated to the UE, by a BS, by SPS. The BS comprises a functional unit adapted to transmit information, to the UE, about a set of MCSs associated with resources allocated by SPS. The BS further comprises a functional unit adapted to determine an MCS from the set. The BS further comprises a functional unit adapted to receive (uplink) data from, and/or transmit (downlink) data to, the UE on at least one of the resources allocated by SPS, using the determined MCS.

The applying of the above methods and apparatuses enables a form of link adaptation for transmissions in SPS allocated resources, thereby improving both system resource efficiency and energy efficiency, primarily in the UE, and further reduces the risk of transmission failure.

The above methods and apparatuses may be implemented in different embodiments. For example, the determining of an MCS in the UE may be based on the amount of data in queue for uplink transmission by the UE; knowledge of the quality of a channel between the UE and the BS; an indication of an MCS related to a HARQ NACK from the BS, the HARQ NACK being related to a transmission of the UE to the BS; reception of one or more HARQ NACKs from the BS; the character of a reference signal received from the BS and/or decoder output for different MCS hypotheses.

Further, the set of MCSs may be extended by the incorporation of an MCS. The determined MCS may be indicated to another node. At least part of the information on the set of MCSs may be provided and received in an SPS configuration in an RRC message; a communication grant related to the SPS and/or a BS broadcast signal. The SPS transmission resources may be allocated proactively.

According to a fifth aspect, a computer program comprising computer readable code means is provided. The code means, when run in a UE, or BS, causes the UE or BS to perform the corresponding method according to the corresponding method of the first and third aspect above.

According to a sixth aspect a computer program product is provided, comprising a computer program according to the fifth aspect above.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

The inventors have realized that resource allocations through semi-persistent scheduling (SPS) could be used in order to reduce the signaling overhead and thus the UE energy consumption in conjunction with resource allocation, and hence uplink transmission, for energy deprived UEs, such as MTC devices, e.g. even proactive SPS resource allocations, which the UE may or may not use. Thus, SPS resources may be allocated proactively, in the sense that it is not known in advance when these SPS resources or which of the SPS resources that will be needed for transmissions. Neither is it necessarily known in advance what type of data the proactively allocated SPS resources will be used for. The inventors have also realized that to fully or efficiently realize, or leverage, the full energy saving potential of proactive SPS resource allocation, it is preferable to let a UE, at least an energy deprived UE, leave an uplink SPS resource unused, i.e. to remain "silent", when there is no uplink data to send in the UE, instead of transmitting a Buffer Status Report (BSR) as stipulated by the currently specified rules. However, the inventors have further realized that the use of SPS for this new purpose is associated with certain problems. These problems and their solution, as suggested by the inventors, will be described herein.

Figure 1A:
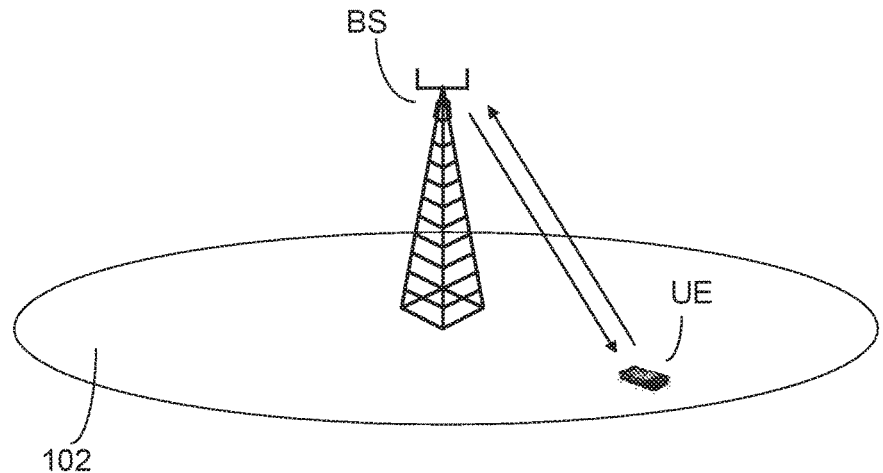
FIG. 1a shows a Base Station and a User Equipment in a wireless communication system, where embodiments of the suggested technology may be applied.
Figure 1B:
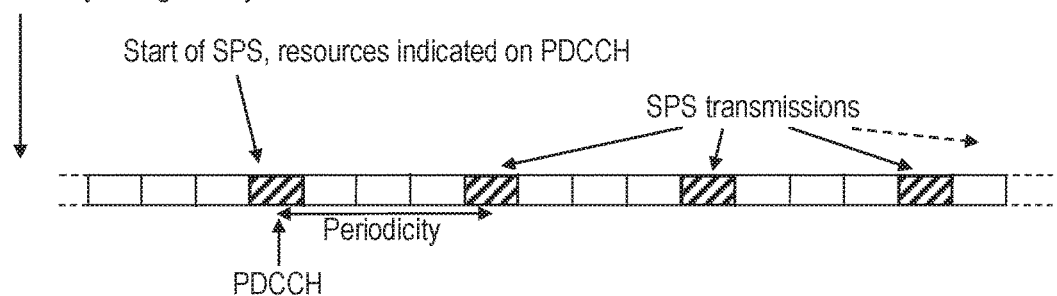
FIG. 1b illustrates the basic principles of SPS, according to the prior art.

With SPS, a UE is provided a scheduling decision on the PDCCH, together with an indication that this scheduling decision applies to every $n^{th}$ subframe until further notice, wherein the periodicity, n, has previously been configured in the UE. Hence, control signaling is only used once for activating an SPS connection, and thus the overhead is reduced, as illustrated in FIG. 1b. The periodicity of SPS transmissions is configured by RRC signaling in advance, while activation and deactivation is done using the PDCCH using a SPS-C-RNTI, which is different from the regular C-RNTI used for dynamic scheduling. The SPS-C-RNTI is provided to the UE during the configuration of the SPS connection. For example, for VoIP, the scheduler can configure a periodicity of 20 ms for SPS via RRC signaling, and, once a talk spurt starts, the semi-persistent pattern is triggered via an uplink grant or a scheduling assignment on the PDCCH.

In LTE, the RRC signaling involves an SPS-Config IE (information element) in the radioResourceConfigDedicated IE using the RRCConnectionSetup message or an RRCConnectionReconfiguration message. Further, in LTE-type systems, the SPS configuration mainly consists of allocation of a UE-specific SPS-C-RNTI and a repetition interval for either or both of uplink and downlink, as applicable, for the resources to be allocated through SPS. The actual allocation of the repetitive SPS resources consists of an uplink grant or a downlink resource assignment, on the PDCCH with the contents of a one-time allocation, but addressed to the SPS-C-RNTI associated with the SPS connection between the UE and BS.

It is this activating uplink grant or downlink resource assignment that specifies the resources, e.g. LTE resource blocks in the frequency and time domain, and the MCS configuration to be used for the repetitive SPS resources. Subsequent uplink grants addressed to the same SPS-C-RNTI will override the previous allocation of resource blocks and specification of MCS configuration. The repetitive resources allocated through SPS may be explicitly released through PDCCH signaling in the form of another uplink grant addressed to the same SPS-C-RNTI with dummy parameter values to indicate 'SPS release'. SPS was designed for scenarios where the communication consists of regularly repeated transmissions of data chunks of more or less well-known type and size. A typical example is a VoIP call.

According to current standards, when a UE has no uplink data to transmit in an uplink resource allocated through SPS, the UE is mandated to send a Buffer Status Report (BSR). An activated uplink SPS resource is released if a BSR indicating empty buffer is sent for a configurable number, either 2 or 3, of consecutive uplink transmissions.

Uplink transmission resources, whether allocated via SPS or using regular one-time allocation, are allocated as one or more chunks of the OFDM time-frequency grid, denoted resource blocks. A resource block consists of 12 subcarriers of 15 kHz each in the frequency domain and a slot of length 0.5 ms in the time domain. Pairs of slots are further grouped together to form 1 ms subframes. Each slot consists of 7 resource elements (or 6 if an extended cyclic prefix is used), each containing an OFDM symbol including cyclic prefix. Hence, each resource block consists of 84 resource elements (or 72 if the extended cyclic prefix is used).

A problem associated with SPS, which has been realized by the inventors, is that the same MCS and transport block size, as well as resource (subcarrier) assignment are used for every transmission, irrespective of changes in the channel conditions of the UE. Thus, dynamic link adaptation and channel adaptive resource assignment cannot be used in conjunction with SPS, unless a new activating resource allocation, addressed to the SPS-C-RNTI, is sent in each SPS interval. Without dynamic link adaptation and channel adaptive resource assignment transmission resources would be suboptimally used, it would reduce both system efficiency and the energy savings in the UE. In addition, when the channel conditions motivate a more robust coding than what is configured for the SPS allocation, there is a high risk of transmission failure and consequent retransmissions. The problem is emphasized in case of proactive SPS allocation, since in this case the amount of data may differ more between transmissions than regular SPS transmissions, such as VoIP samples. Enforcing dynamic link adaptation and channel adaptive resource assignment by preceding every SPS resource with a new activating resource allocation would also be suboptimal, since this would reinstate some of the control signaling overhead, which it is the very purpose of proactive SPS allocation for energy deprived UEs to remove.

In order to solve one or more of the aforementioned problems, it is proposed to extend the SPS configuration scope with a possibility to include multiple MCS configuration for the same SPS resource allocations, wherein the MCS configuration should preferably span an appropriate range of robustness, i.e. redundancy, and hence transport block sizes and data rates. The eNB may also be enabled to associate a different reference signal, e.g. DMRS, with each MCS configuration, e.g. using different sequences and/or phase rotations.

The UE or eNB may (more or less) autonomously select the MCS configuration to use for transmission in an SPS allocated resource, e.g. based on channel quality and/or amount of queued data. Reception of such a transmission may be handled aided by a specific reference signal (e.g. DMRS) associated with the used MCS configuration (as mentioned above) or rely entirely on blind decoding trying all preconfigured MCS configurations.

For the uplink, the suggested solution enables e.g. that the UE, more or less, autonomously decides which of the multiple preconfigured MCS configurations to use for a given SPS allocation, and the UE may change the MCS configuration for each consecutive SPS allocation, if desired.

When determining an MCS configuration, the UE may use one of, or a combination of, the following different strategies. By "determining" is here meant selecting an MCS based on a criterion or identifying an MCS indicated by the eNB:

MCS selection based on amount of data. The UE may select the MCS configuration such that the amount of queued data fits within the allocated resources. Hence, if the UE has a small amount of data to transmit, it may choose a robust MCS configuration (with a lot of redundancy), whereas a large amount of data would imply selection of a more aggressive MCS configuration (with less redundancy), in order to make the data fit within the allocated transmission resources.

MCS selection based on channel quality. The UE may select the MCS configuration based on knowledge of the quality of the uplink channel. Hence, the UE may select a robust MCS configuration when the channel quality is bad and a more aggressive MCS (less robust)

when the channel quality is good. Knowledge about the uplink channel quality could be achieved in several ways:

Downlink measurements. The UE may rely on measurements on downlink transmissions, e.g. reference signals and assume that the qualities of the uplink and downlink channels are reasonably similar. This method is particularly well suited to the case of TDD, where the use of the same frequency band for the uplink and the downlink implies that channel reciprocity (excluding interference) may be assumed.

HARQ feedback. The UE may use the HARQ feedback from the eNB to estimate the channel quality. For instance, if several NACKs are received, i.e. if several HARQ retransmissions are needed to convey the data, the UE may assume that the used MCS configuration was not robust enough and thus the UE may choose to use a more robust MCS configuration for the next SPS allocation. Similarly, if no, or maybe just a single HARQ retransmission was needed to convey the data, the UE may assume that the used MCS configuration was at least robust enough and may choose to use the same or a more aggressive MCS configuration for the next SPS allocation. This is illustrated in FIG. 2c described further below.

MCS indications from the eNB. If the UE receives a NACK and an overriding uplink resource assignment from the eNB, which changes the MCS configuration (and/or resource block assignment) for the HARQ retransmission, the UE may use this MCS indication as the basis for its MCS configuration for the next SPS allocation. Hence, for the next SPS allocation, the UE may identify and apply the one of the preconfigured MCS configuration that is the closest to the one indicated in the overriding uplink resource assignment. Alternatively, if the MCS indication in the overriding uplink resource assignment is not one of the preconfigured MCS configurations, the UE may add this new MCS indication to the set of preconfigured MCS configurations, and thus extend the set, and may hence also use it for the next SPS allocation and/or subsequent SPS allocations. This is illustrated in FIG. 2b described further below.

MCS broadcasted from eNB. A new system information element or broadcast physical layer signaling may be introduced to indicate to all UEs configured with SPS which one of the set of preconfigured MCS configurations to use, e.g. indicated by an index. This indication can for example be determined in the eNB based on the recently experienced interference level. The indication may also be interpreted as an upper bound on MCS configuration, where the UE may still select among the lower values.

Estimated Received Power Spectral Density (SPS). Based on the power control the UE applies and a path loss measurement from the downlink, the UE may compute an estimated PSD, based on some threshold values. The estimated PSD may be used to limit the possible MCS values. This may also be improved with a signal broadcasted from the base station used to update the thresholds.

When receiving such an SPS transmission from a UE, the eNB does not necessarily know in advance which of the preconfigured MCS configuration that the UE uses. To handle the situation, the eNB may decode the DMRS that is used in the transmission and from that derive which MCS configuration to use when decoding the entire transmission, provided that a unique DMRS has been associated with each of the preconfigured MCS configurations. Alternatively, if the same DMRS is used for all MCS configurations, i.e. if the option to associate a unique DMRS with each preconfigured MCS configuration has not been used, the eNB may use blind decoding of the transmission, using each of the preconfigured MCS configurations, until successful decoding is achieved.

The same concept may be used in the downlink. That is, the eNB determines (selects) one of the MCS configurations in a set, based on e.g. either the amount of queued data or knowledge about the downlink channel quality, or a combination thereof. The eNB may indicate the determined MCS to the UE, e.g. using an associated UE specific reference signal. The downlink channel quality estimation may be based on Channel Quality Information reports from the UE. In addition the eNB may use the same indirect indications as described for the UE's uplink channel quality estimation (except the MCS configuration indication in overriding resource assignments), i.e. uplink transmission measurements and HARQ feedback.

The reception of a downlink transmission in the UE may, as in the case of the uplink, be handled aided by specific reference signals or rely entirely on blind decoding.

As an alternative to the above described autonomous MCS selection by the UE, the eNB may associate selection rules with the multi-MCS configuration. The selection rules may be based on, e.g., amount of data and/or channel quality. For instance, threshold values for the amount of queued uplink data may indicate which MCS should be used. Alternatively, or combined with the data amount criteria, thresholds, or other conditions, based on channel quality assessments may be used as selection criteria. The rules/criteria may be conveyed to the UE together with the SPS and MCS configurations or via the broadcast system information.

Below, the term "communication grant" will be used as referring to both scheduling assignments, in case of downlink, and uplink grants in case of uplink.

Figure 2A:
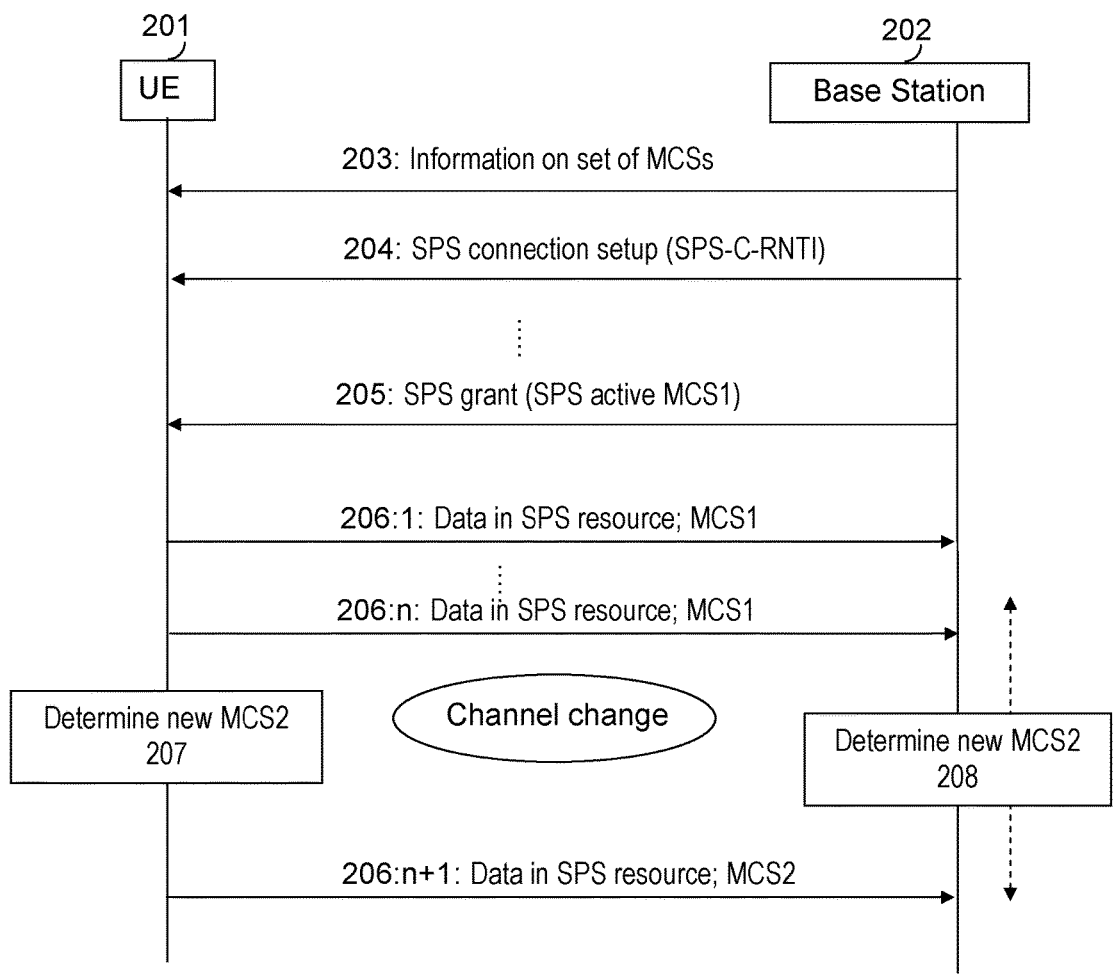
FIGS. 2a-2c are signaling schemes illustrating exemplifying procedures related to the determining of an MCS for SPS from a set of MCSs, according to exemplifying embodiments.
Figure 2B:
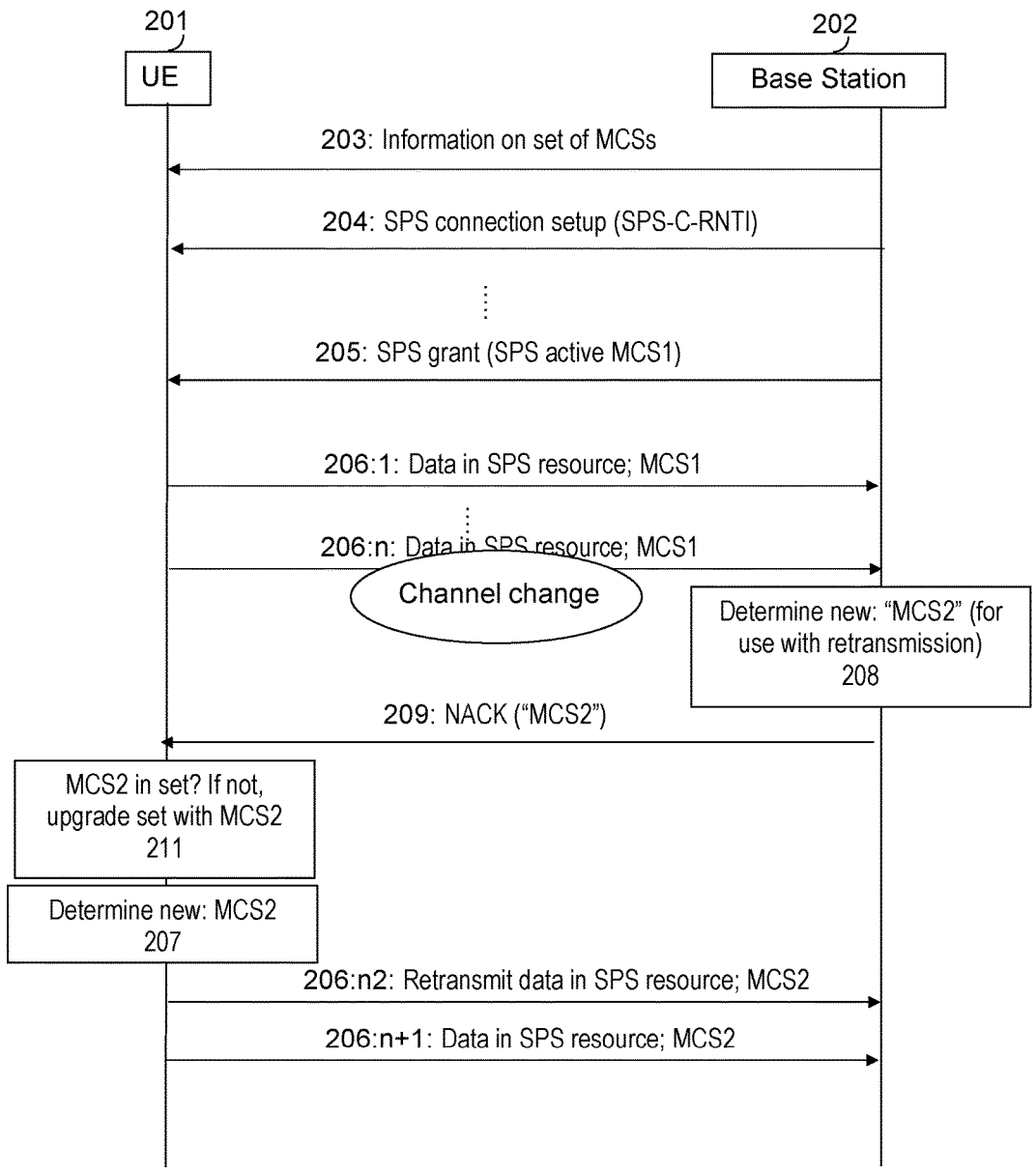
Figure 2C:
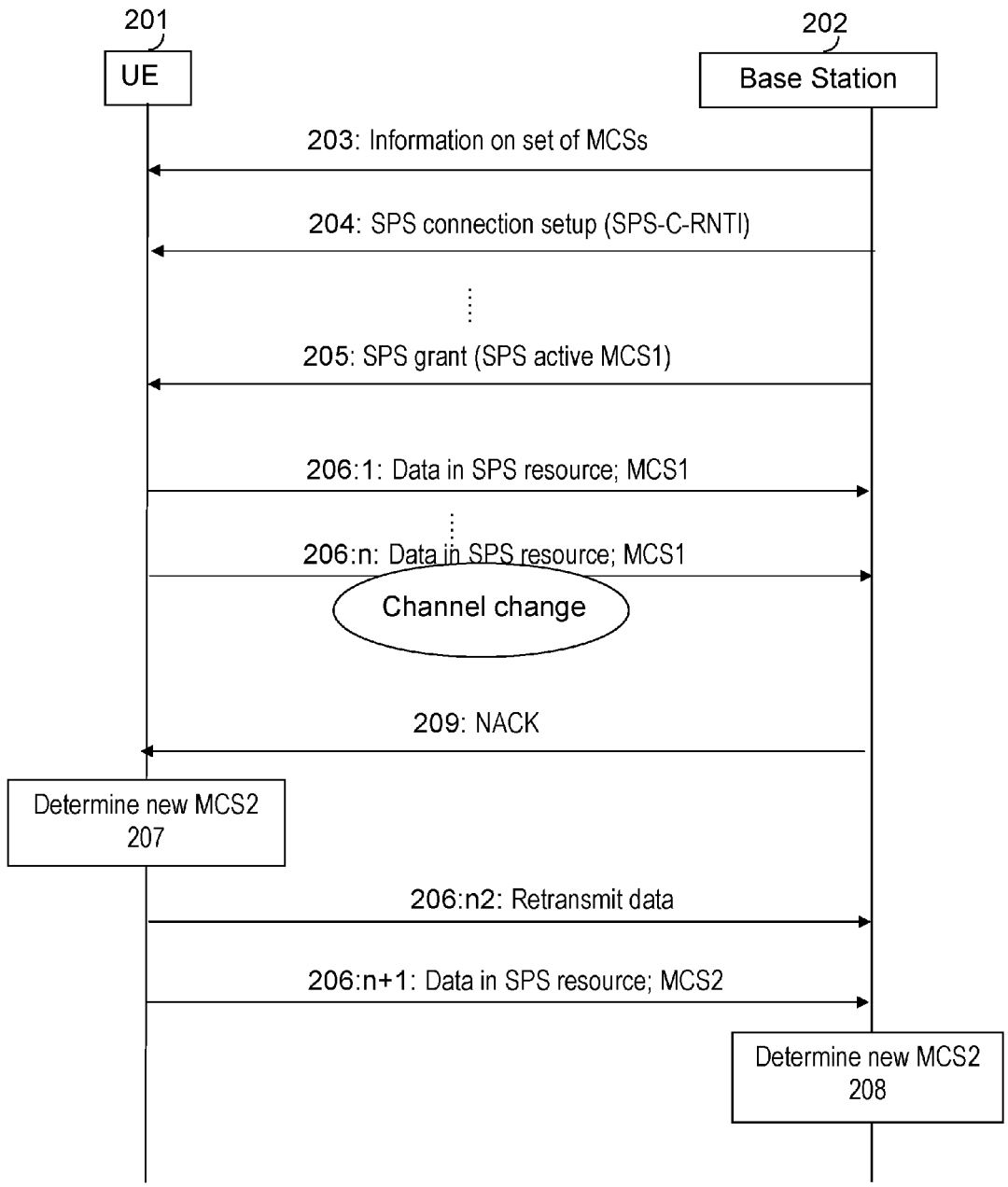

FIG. 2a is a signaling diagram illustrating a dynamic change of MCS during an SPS active period. The signaling takes place between a UE 201 and its serving BS 202. Information on a set of MCSs is conveyed to the UE in a transmission 203. This transmission may take place e.g. when the UE connects to the BS, or in association with the set up of an SPS connection. The information may be comprised in an RRC message 204, which is transmitted to set up an SPS connection, that is, transmissions 203 and 204 may be one and the same. The message 204 may comprise an SPS-C-RNTI, which may be used to identify or indicate the SPS connection during its existence. The message 204 further indicates a periodicity associated with the SPS connection. At some point, the SPS connection is activated by an SPS grant 205, which may indicate the MCS from the set to use for the SPS communication. In FIG. 2a this MCS is denoted "MCS1". This SPS grant 205 further indicates the resources that are allocated for the SPS communication, which may be UL or DL resources. After receiving the activating SPS grant 205, the UE may transmit data in the indicated resources with the periodicity indicated in the SPS connection setup 204. These transmissions of data are illustrated as 206:1-206:n in FIG. 2a. There may be intermissions of a number of periods between the transmissions.

A change in the channel conditions, to the worse or to the better, results in that a new MCS is determined by the UE by selection of an MCS from the set of MCSs, illustrated as action 207, for use on the SPS transmission resources. The new MCS is either determined autonomously by the UE, or based e.g. on some indication from the BS. The logic is that a first party of the UE 201 and the BS 202 determines, by selection of an MCS from the set, a new MCS first, and then a second party determines which MCS that was previously determined by selection by the first party. The two alternatives, i.e. UE or BS first determining the new MCS are illustrated as the dashed arrows. That is, the determining 208 of a new MCS in the BS may take place before or after the determining 207 in the UE. A next UL SPS transmission, 206:n+1, is then performed, for which the new MCS, denoted "MCS2" in FIG. 2a, is used. The FIG. 2a illustrates the case of UL SPS resources, but a similar procedure is possible for DL SPS resources.

FIG. 2b illustrates a situation where a new MCS, "MCS2", is determined 208 by selection by a BS 202 during an active SPS session, and indicated to a UE 201, which then determines, or identifies, the selected MCS, and possibly extends the set of MCSs with the new MCS. That is, a new MCS may be determined dynamically, and not only at the onset of an SPS session. Here, the new "MCS2" is determined by the BS for use in a HARQ retransmission procedure. The BS sends a HARQ NACK 209 and an associated overriding uplink resource assignment, comprising information related to the upcoming HARQ retransmission. For example, the information could comprise an indication of an alternative, extended, frequency resource and/or a modulation scheme. This information could be mapped to an MCS for the SPS resources. This could be described as that an MCS configuration, denoted "MCS2" in FIG. 2b, for the SPS resources is indicated in the overriding uplink resource assignment. "MCS2" is denoted with citation marks in order to illustrate that a mapping may be required in order to determine an MCS2, which is valid for the SPS resources. The UE 201 then determines (identifies) 207 the indicated MCS2, which is then used for the next SPS transmission 206:n+1. If the MCS2, indicated in association with HARQ NACK 209, is not in the set of MCSs known by the UE, the set may be extended to also comprise MCS2. This is illustrated as action 211 in FIG. 2b. The transmissions 203-206:n corresponds to the transmissions, having the same reference numbers, described in association with FIG. 2a.

FIG. 2c illustrates a situation where a NACK 209 is transmitted from a BS 202 to a UE 201 when the channel conditions changes for the worse. In this case, no new MCS is indicated by the BS in association with the HARQ NACK 209. After a preconfigurable number of HARQ NACKs 209, the UE may determine (select) a new MCS, "MCS2" in an action 207, and use MCS2 for the next SPS communication, 206:n+1 to the BS. The BS determines (identifies) MCS2, in an action 208, based on the communication 206:n+1; either by identifying an DMRS used by the UE for the communication 206:n+1, which DMRS is associated with MCS2, or by blind decoding. Note that the new MCS, MCS2, is not used for the retransmission triggered by the NACK that triggered the determination of the new MCS, MCS2, or for any subsequent HARQ retransmissions of the same data triggered by possible additional NACKs from the BS within the same HARQ process. The transmissions 203-206:n corresponds to the transmissions, having the same reference numbers, described in association with FIG. 2a.

SPS Configuration

Figure 3A:
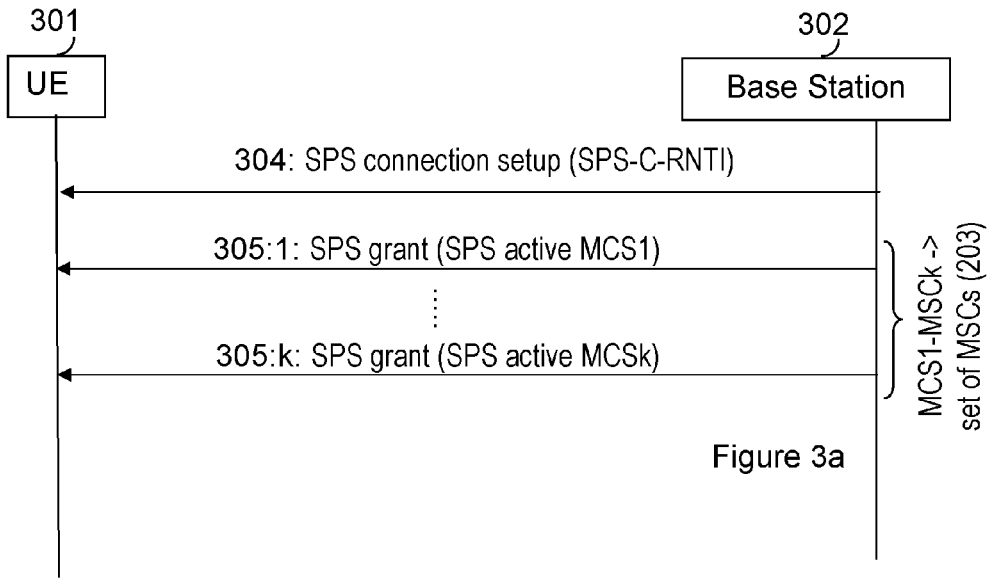
FIGS. 3a-3c are signaling schemes illustrating exemplifying procedures related to the conveying of information on a set of MCSs between a BS and a UE, according to exemplifying embodiments.
Figure 3B:
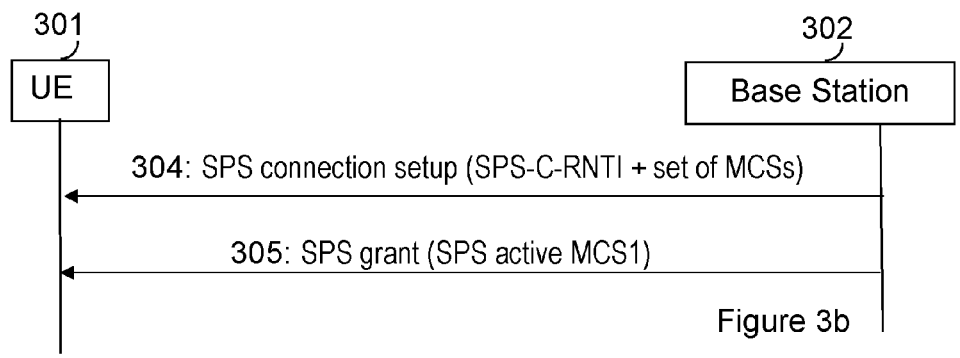

The technology suggested herein may require extended SPS configuration possibilities, as compared to the prior art. Such extended configuration possibilities should preferably be introduced in, with LTE terminology, the SPS-Config IE, which may be conveyed to the UE in the RadioResource-ConfigDedicated IE in the RRCConnectionSetup message or an RRCConnectionReconfiguration message. The SPS-Config IE is then extended with MCS configuration indication(s). Preferably, the multiple alternative MCS configurations, and associated selection rules, if any, should be included in the same SPS-Config IE and associated with the same SPS-C-RNTI, as illustrated in FIG. 3b. When the SPS configuration is activated through an uplink grant addressed to the SPS-C-RNTI, which is included in the SPS-Config IE, all alternative MCS configurations are activated. The uplink grant may include a void or dummy MCS configuration indication. Alternatively, the uplink grant may include an MCS configuration indication which is added to the list of alternative MCS configurations, unless it is equivalent to one of them. The messages and IEs mentioned above in LTE terminology may be denoted differently in other communication standards or systems.

Figure 3C:
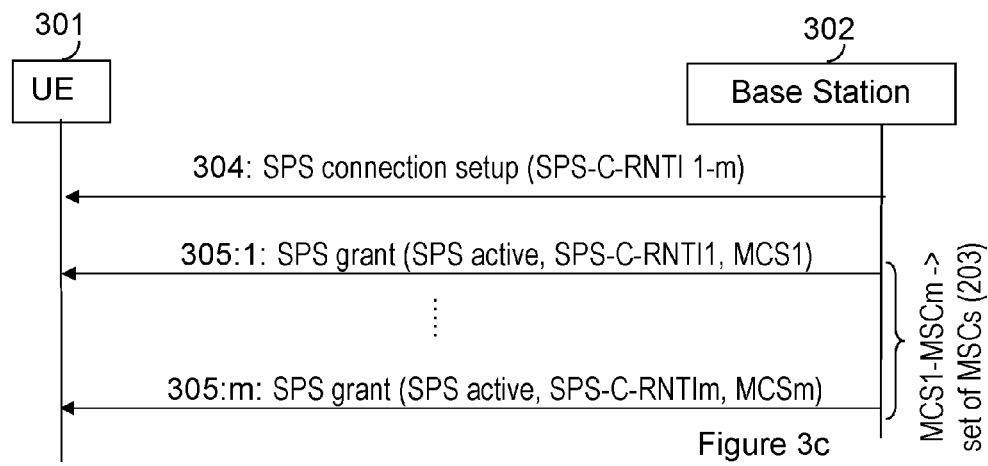

An alternative to including the multiple alternative MCS configurations in the same SPS-Config IE, associated with the same SPS-C-RNTI, could be to associate a different SPS-C-RNTI with each alternative MCS configuration, e.g. as illustrated in FIG. 3c, preferably realized as multiple SPS-Config IEs, or making the IE a sequence of its current content, neither of which is allowed in the current RRC specification. In the former case, the associated selection rules (if any) would be included in one of the SPS-Config IEs or, alternatively, each MCS configuration would have an associated selection rule, such as a channel quality measure and/or a data amount threshold/range. In the latter case, i.e. when the SPS-Config IE is a sequence of its current content, the selection rules, if any, would preferably be included as an item outside the sequence, but associating a selection rule with each item in the sequence is also a possibility. With this alternative the eNB may activate only one of the alternative MCS configurations at a time and may thus choose which of the alternative MCS configurations to activate, by choosing the associated SPS-C-RNTI to be used in the activating communication grant. As above, the MCS configuration indicated in the activating uplink communication grant(s) may be a void or dummy indication or be equal the one previously configured to be associated with the concerned SPS-C-RNTI. Optionally, indicating another MCS configuration than the one previously associated with the SPS-C-RNTI could be a means for the BS to change the MCS configuration associated with the concerned SPS-C-RNTI. With this option the UE should replace the MCS configuration that is currently associated with the SPS-C-RNTI with the new one indicated in the activating resource allocation. An alternative to including the alternative MCS configurations in the SPS-Config IE(s) could be to rely solely on the MCS configuration indications provided in activating communication grants and allow multiple activating communication grants for the same SPS configuration. Each activating communication grant for the same SPS-C-RNTI could thus add another MCS configuration to the set or list of alternative MCS configurations for the SPS configuration. This alternative is illustrated in FIG. 3a. With this alternative there should be an indication to the UE that a communication grant for an already activated SPS-C-RNTI does not override the previous activating communication grant, but adds another MCS configuration. This indication could be included in the SPS configuration signaled via RRC (i.e. a proactive indication) or in each communication grant (i.e. a real-time indication). The latter would enable the eNB to choose between an overriding communication grant and an uplink grant that adds another MCS configuration.

This solution serves to increase system resource efficiency as well as improving the possibilities for energy savings in the UE.

Figure 4:
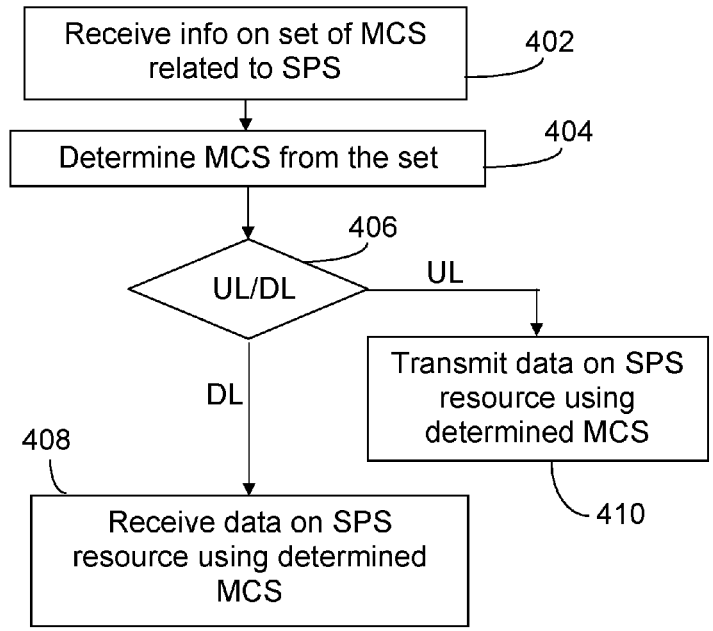
FIG. 4 is a flow chart illustrating procedure in a UE, according to an exemplifying embodiment.

Exemplifying Procedure in a UE, FIG. 4

A procedure in a UE is illustrated in FIG. 4. The UE is assumed to be associated with transmission resources, allocated by Semi-Persistent Scheduling, SPS. In a specific embodiment, the resources have been allocated proactively. The resources are here assumed to have been allocated to the UE by the network node which is currently the serving Base Station, BS, e.g. an eNB. However, the resources may have been allocated to the UE by another BS, serving the UE before being handed over to the current serving BS.

Information on a set of MCSs related to SPS is received in an action 402. The information is received from a serving BS. An MCS from the set is determined in an action 404, to be used for communication on at least one resource allocated by SPS, which may be an uplink and/or downlink resource. Thus a currently preferred MCS is identified by the UE. The currently preferred MCS is then used for communication on at least one of the resources allocated by SPS. In case of uplink SPS resources, data is transmitted using the currently preferred MCS in an action 410; and in case of downlink SPS resources, data is received using the currently preferred MCS in an action 408. "Transmitting using an MCS" implies modulating and coding according to said MCS, and "receiving using an MCS" implies demodulating and decoding according to said MCS.

The determining of an MCS, e.g. by selection of an MCS from the set could be based on different things. For example, the determining could be based on the amount of data waiting in a queue for uplink transmission by the UE. The determining could also or alternatively be based on knowledge of the quality of a channel between the UE and the BS. For example, the quality of the channel could be estimated based on one or more of e.g. measurements on downlink transmissions; feedback from the BS, related to previous transmissions of the UE, and, an estimated received power spectral density.

The determining of an MCS from the set could also or alternatively be based on an indication of an MCS related to a HARQ NACK from the BS, the NACK being related to a transmission of the UE to the BS. This is also illustrated in the signalling diagram in FIG. 2b.

The determining of an MCS from the set could also or alternatively be based on the character of a reference signal received from the BS. For example, the reference signal could be a DMRS, and the phase shift used on the DMRS could, e.g. according to a scheme known to both BS and UE, indicate a certain MCS from the set, which should be determined and identified by the UE.

The determining of an MCS from the set could also or alternatively be based on the reception of one or more NACKs, i.e. indications of requests for HARQ retransmissions of uplink data, from the BS, e.g. the reception of a configurable number of NACKs pertaining to the same initial uplink transmission (and thus representing a configurable number of requests for HARQ retransmissions of the same uplink data).

The determining of an MCS from the set could also or alternatively be based on so-called "blind decoding". Blind decoding means attempting to decode a received transmission using one MCS at a time from the set of MCSs and observing the decoder output associated with the different MCSs. The correct MCS, i.e. the MCS used by the transmitting BS, may be identified when of one of the decoding attempts succeeds. This could also be described as that the determining is based on decoder output for different MCS hypotheses.

The set of MCSs may be extended by incorporation of an MCS, indicated by the BS. The MCS to be incorporated could e.g. be indicated in association with a HARQ NACK, as previously described e.g. in association with FIG. 2b. For example, an MCS could be indicated in a resource allocation, e.g. an uplink resource allocation overriding a HARQ, Normally, an MCS, or corresponding information, indicated in association with a HARQ NACK for use in retransmission is only valid for the following retransmission. Here, however, the MCS indicated in association with the NACK may be incorporated in the set of MCSs, if not already comprised in the set, and then be determined to be the currently preferred MCS. As previously described, the determining of the indicated MCS may require a mapping, e.g. since the resources for the retransmission may differ from the SPS resources. Further, a new MCS, not in the set, could be included or indicated in a communication grant from the BS. This new MCS could then be incorporated in the set of MCSs and determined and identified as currently preferred MCS. For example, the set may be extended based on MCSs received in subsequent activating UL grants. Such subsequent grants could also comprise an indication of that the grant does not override a previous grant, as previously described.

When the currently preferred MCS is not determined based on an indication from the BS, but autonomously by the UE, the currently preferred MCS could be indicated to the BS. Such an indication could be either explicit or implicit.

The information, or at least part thereof, on the set of MCSs may be received from the BS in at least one of an SPS configuration in an RRC message; a communication (UL or DL) grant related to the SPS, and/or a broadcast signal.

Figure 6:
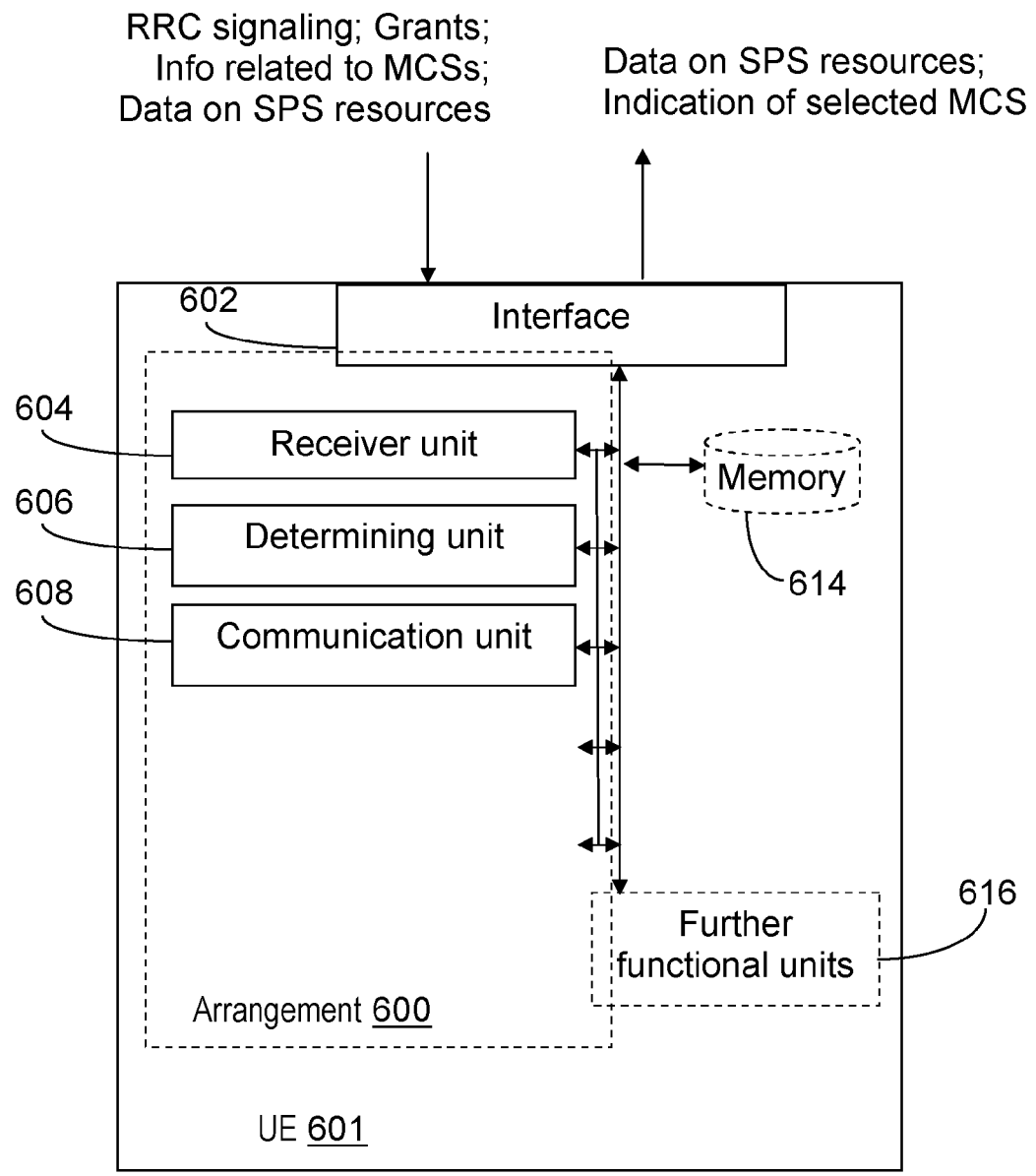
FIG. 6 is a block chart, illustrating a UE, according to an exemplifying embodiment.

Exemplifying UE, FIG. 6

Below, an exemplifying UE 601, adapted to enable the performance of the above described procedure will be described with reference to FIG. 6. The UE 601 is operable to be allocated transmission resources by Semi-Persistent Scheduling, SPS, by a serving BS.

The UE 601 is illustrated as to communicate with other entities via an interface 602, which may be considered to comprise means for wireless uplink and downlink communication. Parts of the UE which are adapted to enable the performance of the above described procedure are illustrated as an arrangement 600, surrounded by a dashed line. The arrangement and/or UE may further comprise other functional units 614, for providing e.g. regular UE functions, such as user interaction and signal processing. The arrangement and/or UE may further comprise one or more storage units 612.

The arrangement 600 could be implemented by processing circuitry, e.g. by one or more of: a processor or a micro processor and adequate software and storage therefore, a Programmable Logic Device (PLD) or other electronic component(s)/processing circuit(s) configured to perform the actions mentioned above in conjunction with FIG. 4.

The arrangement part of the UE may be implemented and/or described as follows: The UE comprises a receiver unit 604, adapted to receive information from a BS on a set of MCSs, where the MCSs are associated with the resources allocated by SPS. Either the specific SPS connection between the UE and the BS, or generally to a number of SPS connections, e.g. all SPS connections associated with the BS. The UE further comprises a determining unit 606, which could alternatively be denoted "selecting unit" and/or "identifying unit", or, could represent two different units, one selecting unit and one identifying unit. The determining unit is adapted to dynamically determine an MCS from the set for communication on at least one of the resources allocated by SPS, thus identifying a currently preferred MCS. The determining could be based on different things, as previously described. Further, the UE comprises a communication unit 608, adapted to transmit and/or receive data on at least one of the resources allocated by SPS, using the currently preferred MCS. The receiving unit 604 could be part e.g. of the communication unit 608.

Figure 5:
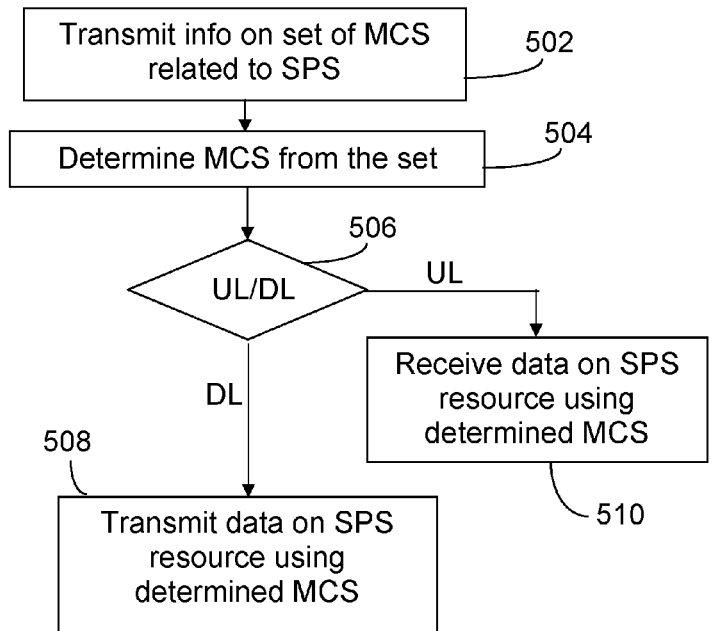
FIG. 5 is a flow chart illustrating procedure in a BS, according to an exemplifying embodiment.

Exemplifying Procedure in a BS, FIG. 5

A procedure in a BS is illustrated in FIG. 5. The BS is assumed to be serving a UE associated with transmission resources, allocated by Semi-Persistent Scheduling, SPS. The resources may be assumed to have been allocated by the serving BS, but could alternatively have been allocated to the UE by another serving BS, e.g. before handover. In a specific embodiment, the resources have been allocated proactively.

Information on a set of MCSs are transmitted to the UE in an action 502. The action 502 may comprise e.g. transmission one or more messages and/or indications to the UE. The MCSs in the set are associated with the resources allocated by SPS. The MCS could either be associated with the specific SPS connection between the UE and the BS, or be generally associated with a number of SPS connections, e.g. all SPS connections of the BS.

A MCS from the set is determined in an action 504. The MCS could be determined based on different criteria, such as e.g. the amount of data in queue for downlink transmission by the BS (to the UE). The determining could alternatively or in addition be based e.g. on an indication from the UE of a currently preferred MCS (determined by the UE). Further possibilities will be described below.

The determined MCS is then used for communication on at least one of the resources allocated by SPS. In case of uplink SPS resources, data is received using the determined MCS in an action 510; and in case of downlink SPS resources, data is transmitted using the currently preferred MCS in an action 508. "Receiving using an MCS" implies demodulating and decoding according to said MCS, and "transmitting using an MCS" implies modulating and coding according to said MCS.

The determining of an MCS from the set could also or alternatively be based on knowledge of the quality of a channel between the BS and the UE. For example, the quality of the channel could be estimated based on one or more of e.g. measurements on uplink transmissions from the UE; feedback from the UE, related to previous transmissions of the BS, and, an estimated received power spectral density.

The determining of an MCS from the set could also or alternatively be based on the reception of one or more NACKs (i.e. indications of requests for HARQ retransmissions of downlink data) from the UE, e.g. the reception of a configurable number of NACKs pertaining to the same initial downlink transmission (and thus representing a configurable number of requests for HARQ retransmissions of the same downlink data).

The determining of an MCS from the set could also or alternatively be based on the character of a reference signal received from the UE. For example, the reference signal could be a DMRS, and the phase shift used on the DMRS could, e.g. according to a scheme known to both BS and UE, indicate a certain MCS from the set, which should be determined (identified) by the BS.

The determining of an MCS from the set could also or alternatively be based on so-called "blind decoding". As previously described blind decoding relates to trying the MCSs for decoding a transmission from the UE until the correct MCS is found, i.e. the one which gives a correctly decoded signal.

The set of MCSs could be extended by incorporation of an MCS. Since both the UE and the BS must be aware of which MCSs that are currently comprised in the set, a new MCS should be communicated to the other party. The MCS to be incorporated could e.g. be indicated to the UE in association with a HARQ NACK. Normally, an MCS indicated in association with a NACK for use in retransmission is only valid for the following retransmission. Here, however, the UE may incorporate the indicated MCS in the set of MCSs, if not already comprised in the set. Further, a new MCS, not in the set, could be included or indicated in a communication grant to the UE. This new MCS could then be incorporated in the set of MCSs. For example, MCSs may be added to the set through subsequent activating UL grants comprising new MCSs.

When the determined MCS is not determined e.g. based on an indication from the UE or mutual selection rules related to channel quality, the UE may be unaware of the MCS determined by the BS. Therefore, in such cases, the determined MCS should be indicated to the UE in order to be identified as the currently preferred MCS. Such an indication could be either explicit or implicit.

The information, or at least part thereof, on the set of MCSs may be conveyed to the UE in at least one of an SPS configuration in an RRC message; a communication (UL or DL) grant related to the SPS, and/or a broadcast signal.

Figure 7:
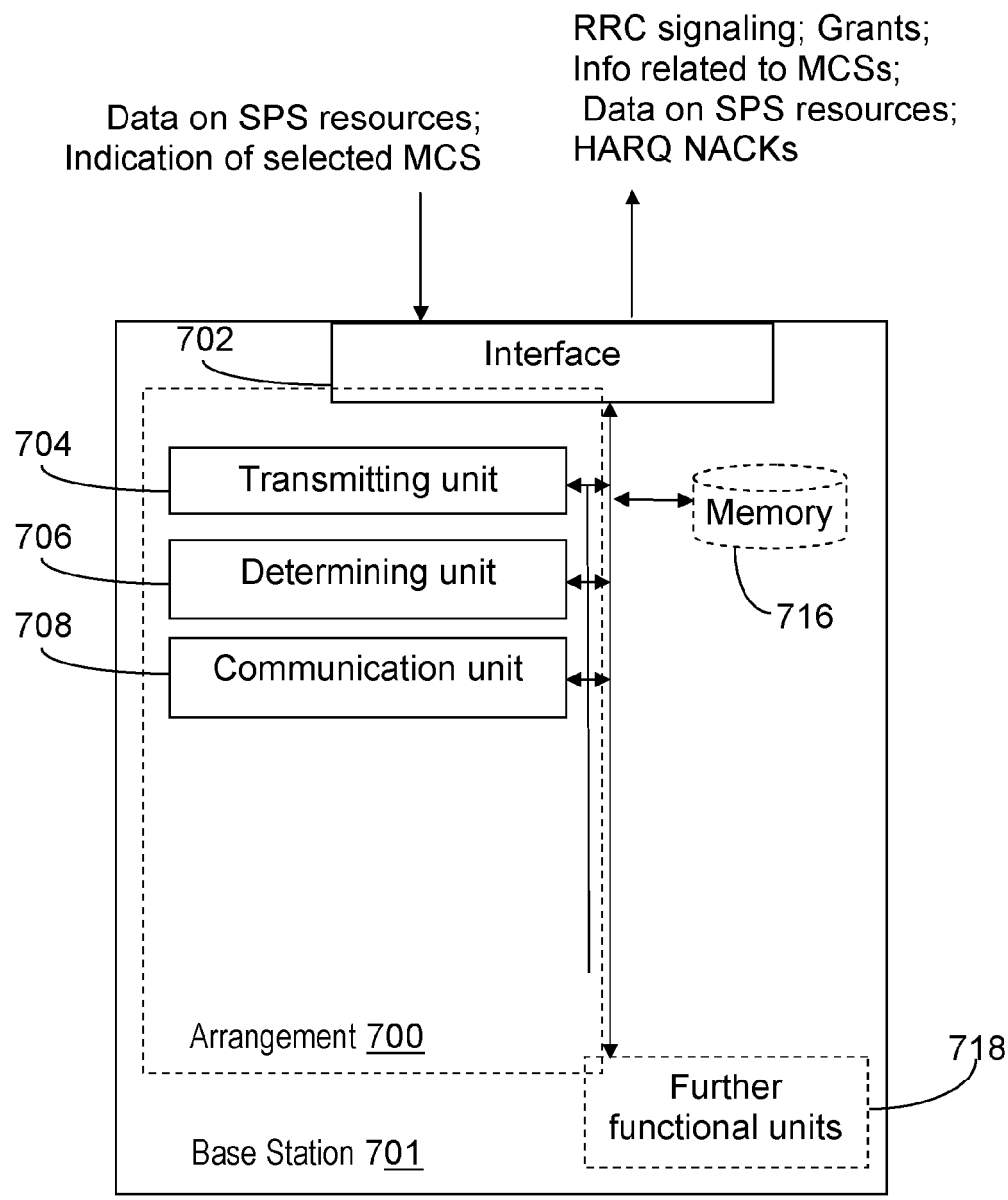
FIG. 7 is a block chart, illustrating a BS, according to an exemplifying embodiment.

Exemplifying BS, FIG. 7

Below, an exemplifying BS 701, adapted to enable the performance of the above described procedure in a BS, will be described with reference to FIG. 7. The BS 701 is operable to serve a UE associated with transmission resources, allocated to the UE, by a/the BS, by Semi-Persistent Scheduling, SPS. That is, the resources may be allocated to the UE by the BS 701, or another BS serving the UE, e.g. before a hand-over to the BS 701.

The BS 701 is illustrated as to communicate with other entities via an interface 702, which may be considered to comprise means for wireless uplink and downlink communication. The interface may alternatively be denoted e.g. "transceiver" Parts of the BS which are adapted to enable the performance of the above described procedure are illustrated as an arrangement 700, surrounded by a dashed line. The arrangement and/or BS may further comprise other functional units 714, for providing e.g. regular BS functions, such as backhaul communication and signal processing. The arrangement and/or BS may further comprise one or more storage units 712.

The arrangement 700 could be implemented by processing circuitry, e.g. by one or more of: a processor or a micro processor and adequate software and storage therefore, a Programmable Logic Device (PLD) or other electronic component(s)/processing circuit(s) configured to perform the actions mentioned above in conjunction with FIG. 5.

The arrangement part of the BS may be implemented and/or described as follows:

The BS comprises a transmitting unit 704, adapted to transmit information, to the UE, about a set of MCSs, associated with the resources allocated by SPS. As previously described the MCSs could either be associated with the specific SPS connection between the UE and the BS, or with a number of SPS connections, e.g. all SPS connections associated with the BS. The BS further comprises a determining unit 706, which could alternatively be denoted "selecting unit" and/or "identifying unit", or, could represent two units, one selecting unit and one identifying unit. The determining unit is adapted to determine an MCS from the set, for communication on at least one of the resources allocated by SPS. The determining could be based on different things, as previously described. Further, the BS comprises a communication unit 708, adapted to transmit and/or receive data on at least one of the resources allocated by SPS, using the currently preferred MCS. The transmitting unit 704 could be part e.g. of the communication unit 708.

The BS could further be adapted to, e.g. comprise functional units adapted to, perform some or all of the different actions of the embodiments described above in conjunction with the procedure in a BS.

Figure 8:
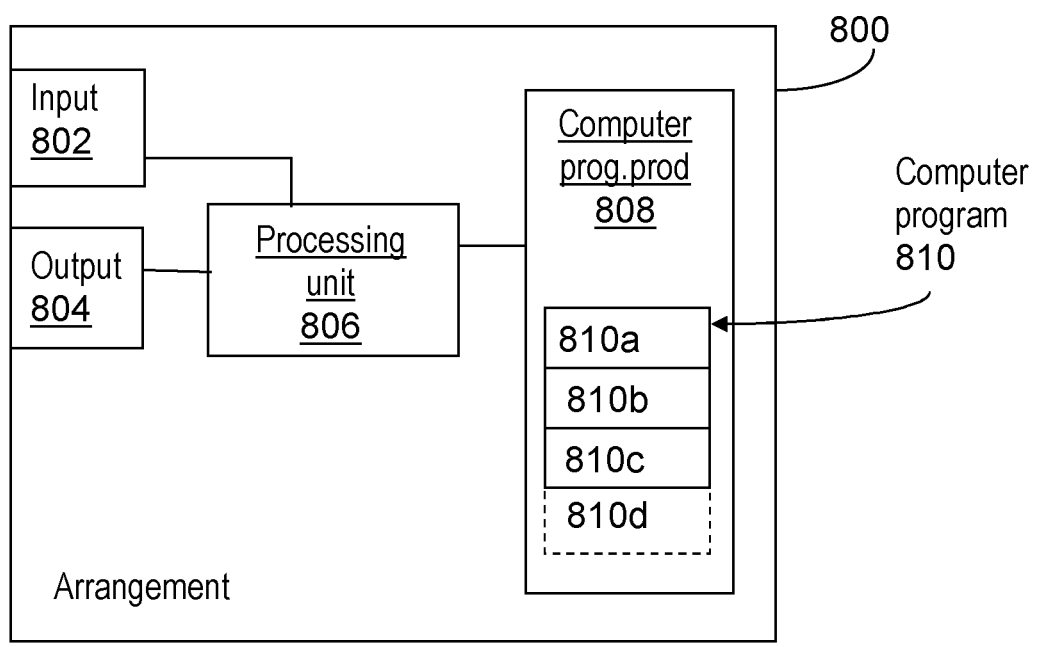
FIG. 8 is a block chart illustrating an arrangement according to an exemplifying embodiment.

Exemplifying Embodiment, FIG. 8

FIG. 8 schematically shows a possible embodiment of an arrangement 800, which also can be an alternative way of disclosing an embodiment of the arrangement illustrated in any of FIG. 6 or 7. Comprised in the arrangement 800 are here a processing unit 806, e.g. with a DSP (Digital Signal Processor). The processing unit 806 may be a single unit or a plurality of units to perform different actions of procedures described herein. The arrangement 800 may also comprise an input unit 802 for receiving signals from other entities, and an output unit 804 for providing signal(s) to other entities. The input unit 802 and the output unit 804 may be arranged as an integrated entity.

Furthermore, the arrangement 800 comprises at least one computer program product 808 in the form of a non-volatile memory, e.g. an EEPROM (Electrically Erasable Programmable Read-Only Memory), a flash memory and/or a hard drive. The computer program product 808 comprises a computer program 810, which comprises code means, which when executed in the processing unit 806 in the arrangement 800 causes the arrangement and/or a node in which the arrangement is comprised to perform the actions e.g. of the procedures described earlier in conjunction with FIG. 4 or 5.

The computer program 810 may be configured as a computer program code structured in computer program modules. Hence, in an exemplifying embodiment for use in a UE, the code means in the computer program 810 of the arrangement 800 may comprise a receiver module 810*a* for receiving information on a set of MCSs. The computer program 810 may further comprise a determining module 810*b*, for determining an MCS from the set and thus identifying a currently preferred MCS. The computer program 810 may further comprise a communication module 810*c*, for applying the determined MCS on communications to and from a serving BS. The computer program may further comprise additional computer program modules 810*d*, adapted to provide some or all of the different actions of the embodiments described above in conjunction with the procedure in a UE.

A corresponding arrangement in a BS could be described in a similar manner, with the necessary changes made, which changes may be derived from other parts of this document.

The modules 810*a-c* could essentially perform the actions of the flow illustrated in FIG. 4, to emulate the arrangement 600 illustrated in FIG. 6.

Although the code means in the embodiment disclosed above in conjunction with FIG. 8 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node or within the UE.

The above description of various embodiments of the herein suggested technology, while not limited to use in LTE systems, should be read and understood in the context of the existing 3GPP standards and revisions thereto, and should be understood to reflect adaptations of well-known physical structures and devices to carry out the described techniques.

Examples of several embodiments of the herein suggested technology have been described in detail above. Those skilled in the art will appreciate that the herein suggested technology can be implemented in other ways than those specifically set forth herein, without departing from essential characteristics of the i suggested technology.

The solution suggested by the inventors is herein mostly described in terms of EPS/LTE. It should, however, be noted that the general concepts of the solution are applicable also at least to UMTS/WCDMA/HSPA.

It is to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

ABBREVIATIONS

3GPP $3^{rd}$ Generation Partnership Project
BS Base Station, e.g. eNB
BSR Buffer Status Report
C-RNTI Cell Radio Network Temporary Identifier
DMRS Demodulation Reference Signal
eNB,
eNodeB evolved (E-UTRAN) NodeB
EPS Evolved Packet System
E-UTRAN Evolved UTRAN
HARQ Hybrid Automatic Repeat request
HSPA High Speed Packet Access
IE Information Element
IP Internet Protocol
LTE Long Term Evolution
M2M Machine-to-Machine
MCS Modulation and Coding Scheme
MD Machine Device
MTC Machine Type Communication OFDM Orthogonal Frequency Division Multiplexing
PDCCH Physical Downlink Control Channel
RRC Radio Resource Control
SPS Semi-Persistent Scheduling
UE User Equipment
UMTS Universal Mobile Telecommunications System
UTRAN Universal Terrestrial Radio Access Network
VoIP Voice over IP

The invention claimed is:

1. A method performed by a User Equipment, UE, associated with transmission resources, allocated by Semi-Persistent Scheduling, SPS, the method comprising:
   receiving information from a Base Station, BS, about a set of Modulation and Coding Schemes, MCSs, associated with resources allocated by SPS;
   determining an MCS from the set, for communication on at least one resource allocated by SPS, thus identifying a currently preferred MCS, said determining the MCS from the set performed autonomously by the UE, based on at least one of: the amount of data in queue for uplink transmission by the UE, and knowledge of the quality of a channel between the UE and the BS; and
   transmitting and/or receiving data on the at least one resource allocated by SPS, using the currently preferred MCS;
   wherein the determining of the MCS from the set is further based on at least one of:
      an indication of an MCS related to a HARQ NACK from the BS, the NACK being related to a transmission of the UE to the BS;
      reception of one or more HARQ NACKs from the BS, the HARQ NACKs being related to an initial transmission and subsequent retransmissions from the UE;
      the character of a reference signal received from the BS; and
      decoder output for different MCS hypotheses.

2. The method according to claim 1, further comprising obtaining the knowledge of the quality of the channel between the UE and the BS based on estimating the quality of the channel according to at least one of:
   measurements on downlink transmissions;
   feedback from the BS, related to previous transmissions of the UE; and
   an estimated received power spectral density.

3. The method according to claim 1, wherein the set of MCSs is extended by incorporation of an MCS, indicated by the BS.

4. The method according to claim 1, further comprising indicating the currently preferred MCS to the BS.

5. The method according to claim 1, wherein at least part of the information on the set of MCSs is received in at least one of:
   an SPS configuration in an RRC message;
   a communication grant related to the SPS; and
   a BS broadcast signal.

6. The method according to claim 1, wherein the transmission resources are allocated proactively.

7. A User Equipment, UE, operable to be allocated transmission resources by Semi-Persistent Scheduling, SPS, the UE comprising:
   a receiver unit, adapted to receive information from a Base Station, BS, about a set of Modulation and Coding Schemes, MCSs, associated with resources allocated by SPS;
   a determining unit, adapted to determine an MCS from the set, for communication on at least one of the resources allocated by SPS, thus identifying a currently preferred MCS, said determining unit configured to determine the MCS from the set autonomously, based on at least one of: the amount of data in queue for uplink transmission by the UE, and knowledge of the quality of a channel between the UE and the BS; and
   a communication unit, adapted to transmit and/or receive data on the at least one resource allocated by SPS, using the currently preferred MCS;
   wherein the determining of the MCS from the set is further based on at least one of:
      an indication of an MCS related to a HARQ NACK from the BS, the HARQ NACK being related to a transmission of the UE to the BS;
      reception of one or more HARQ NACKs from the BS, the HARQ NACKs being related to an initial transmission and subsequent retransmissions from the UE;
      the character of a reference signal received from the BS; and
      decoder output for different MCS hypotheses.

8. The UE according to claim 7, wherein the determining unit is configured to obtain the knowledge of the quality of the channel between the UE and the BS based on estimating the quality of the channel according to at least one of:
   measurements on downlink transmissions;
   feedback from the BS, related to previous transmissions of the UE; and
   an estimated received power spectral density.

9. The UE according to claim 7, further adapted to extend the set of MCSs by incorporation of an MCS indicated by the BS.

10. The UE according to claim 7, further adapted to indicate the currently preferred MCS to the BS.

11. The UE according to claim 7, wherein at least part of the information on the set of MCSs is received in at least one of:
   an SPS configuration in an RRC message;
   a communication grant related to the SPS; and
   a BS broadcast signal.

12. The UE according to claim 7, wherein the transmission resources are allocated proactively.

13. A method performed by a Base Station, BS, serving a User Equipment, UE, associated with transmission resources allocated to the UE by Semi-Persistent Scheduling, SPS, by a BS, the method comprising:
   transmitting information, to the UE, about a set of Modulation and Coding Schemes, MCSs, associated with resources allocated by SPS;
   determining an MCS from the set, said determining of the MCS from the set done autonomously by the BS, based on at least one of: the amount of data in queue for downlink transmission by the BS, and knowledge of the quality of a channel between the BS and the UE; and
   receiving data from and/or transmitting data to the UE on at least one of the resources allocated by SPS, using the determined MCS;
   wherein the determining of the MCS from the set is further based on at least one of:
      an indication from the UE of a currently preferred MCS;
      reception of one or more HARQ NACKs from the UE, the HARQ NACKs being related to an initial transmission and subsequent retransmissions from the BS;

the character of a reference signal received from the UE; and decoder output for different MCS hypotheses.

14. The method according to claim 13, further comprising obtaining the knowledge of the quality of the channel between the BS and the UE based on estimating the quality of the channel according to at least one of:
   measurements on transmissions from the UE;
   feedback from the UE, related to previous downlink transmissions; and
   an estimated received power spectral density.

15. The method according to claim 13, wherein the set of MCSs is extended by incorporation of an MCS, which MCS is also signaled to the UE.

16. The method according to claim 13, further comprising indicating the determined MCS to the UE.

17. The method according to claim 13, wherein at least part of the information on the set of MCSs is transmitted to the UE in at least one of:
   an SPS configuration in an RRC message;
   a communication grant related to the SPS; and
   a broadcast signal.

18. The method according to claim 13, wherein the transmission resources are allocated proactively.

19. A base station, BS, operable to serve a User Equipment, UE, associated with transmission resources, allocated to the UE, by a BS, by Semi-Persistent Scheduling, SPS, the BS being characterized in that it comprises:
   a transmitting unit, adapted to transmit information, to the UE, about a set of Modulation and Coding Schemes, MCSs, associated with resources allocated by SPS;
   a determining unit, adapted to determine an MCS from the set, said determining unit configured to determine the MCS from the set autonomously, based on at least one of: the amount of data in queue for downlink transmission by the BS, and knowledge of the quality of a channel between the BS and the UE; and
   a communication unit adapted to receive data from and/or transmit data to the UE on at least one of the resources allocated by SPS, using the determined MCS;
   wherein the determining of the MCS from the set is further based on at least one of:
      an indication from the UE of a currently preferred MCS;
      reception of one or more HARQ NACKs from the UE, the HARQ NACKs being related to an initial transmission and subsequent retransmissions from the BS;
      the character of a reference signal received from the UE; and
      decoder output for different MCS hypotheses.

20. The BS according to claim 19, wherein the determining unit is configured to obtain the knowledge of the quality of the channel between the BS and the UE based on estimating the quality of the channel according to at least one of:
   measurements on transmissions from the UE;
   feedback from the UE, related to previous downlink transmissions; and
   an estimated received power spectral density.

21. The BS according to claim 19, wherein the set of MCSs is extended by incorporation of an MCS, which MCS is also signaled to the UE.

22. The BS according to claim 19, further adapted to indicate the determined MCS to the UE.

23. The BS according to claim 19, wherein at least part of the information on the set of MCSs is transmitted to the UE in at least one of:
   an SPS configuration in an RRC message;
   a communication grant related to the SPS; and
   a broadcast signal.

24. The BS according to claim 19, wherein the transmission resources are allocated proactively.

25. A non-transitory computer-readable medium storing a computer program comprising program instructions that, when executed by processing circuitry in a User Equipment, UE, operable to be allocated transmission resources by Semi-Persistent Scheduling, SPS, configures the UE to:
   receive information from a Base Station, BS, about a set of Modulation and Coding Schemes, MCSs, associated with resources allocated by SPS;
   determine an MCS from the set, for communication on at least one of the resources allocated by SPS, thus identifying a currently preferred MCS, said determination of the MCS from the set done autonomously by the UE, based on at least one of: the amount of data in queue for uplink transmission by the UE, and knowledge of the quality of a channel between the UE and the BS; and
   transmit and/or receive data on the at least one resource allocated by SPS, using the currently preferred MCS;
   wherein the determining of the MCS from the set is further based on at least one of:
      an indication of an MCS related to a HARQ NACK from the BS, the NACK being related to a transmission of the UE to the BS;
      reception of one or more HARQ NACKs from the BS, the HARQ NACKs being related to an initial transmission and subsequent retransmissions from the UE;
      the character of a reference signal received from the BS; and
      decoder output for different MCS hypotheses.

26. A non-transitory computer-readable medium storing a computer program comprising program instructions that, when executed by processing circuitry in a base station, BS, that is operable to serve a User Equipment, UE, associated with transmission resources that are allocated to the UE by the BS, by Semi-Persistent Scheduling, SPS, configures the BS to:
   transmit information, to the UE, about a set of Modulation and Coding Schemes, MCSs, associated with resources allocated by SPS;
   determine an MCS from the set, said determination of the MCS from the set done autonomously by the BS, based on at least one of: the amount of data in queue for downlink transmission by the BS, and knowledge of the quality of a channel between the BS and the UE; and
   receive data from and/or transmit data to the UE on at least one of the resources allocated by SPS, using the determined MCS;
   wherein the determining of the MCS from the set is further based on at least one of:
      an indication from the UE of a currently preferred MCS;
      reception of one or more HARQ NACKs from the UE, the HARQ NACKs being related to an initial transmission and subsequent retransmissions from the BS;
      the character of a reference signal received from the UE; and
      decoder output for different MCS hypotheses.

* * * * *